UNITED STATES PATENT OFFICE.

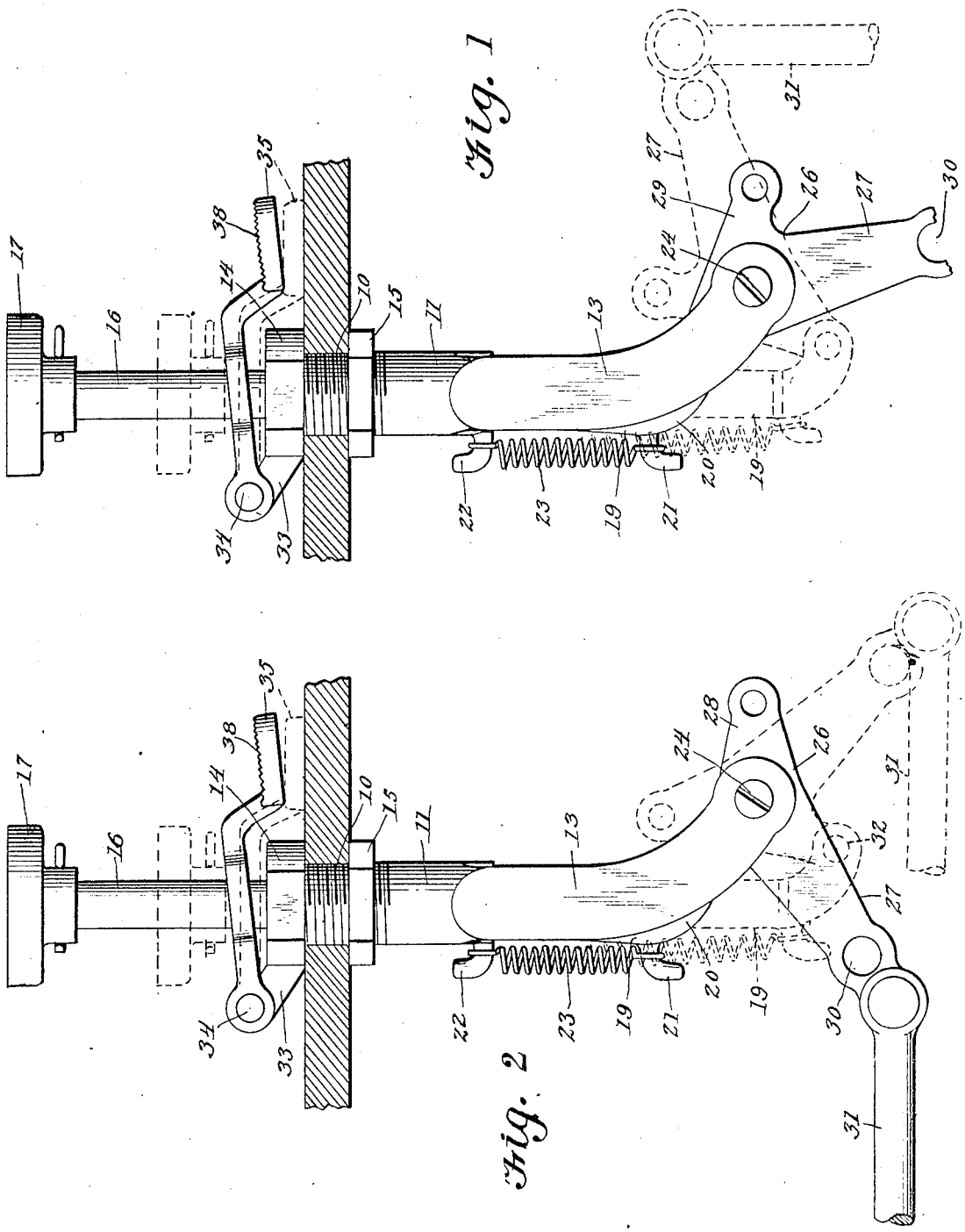

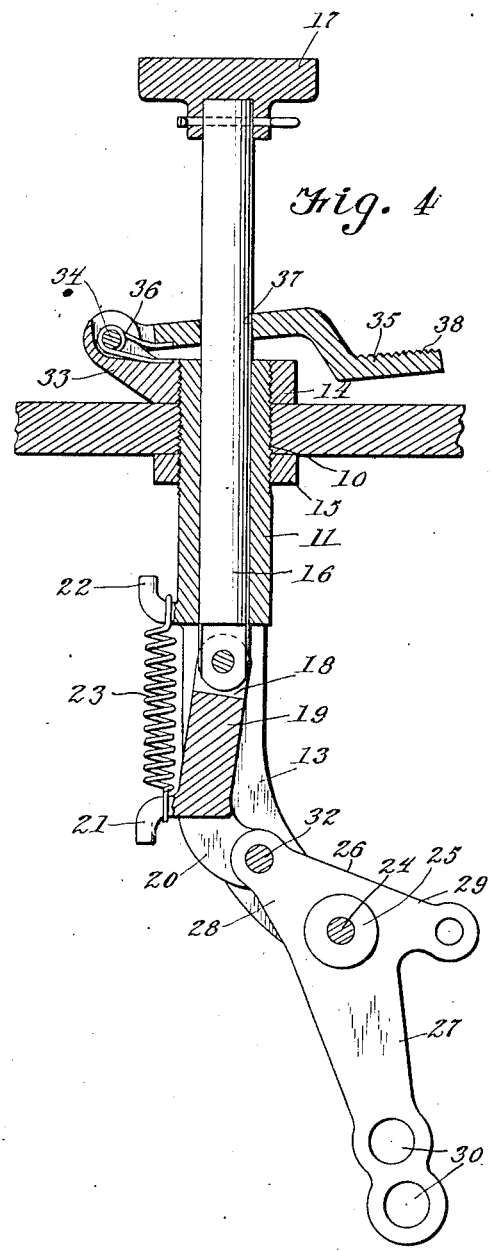
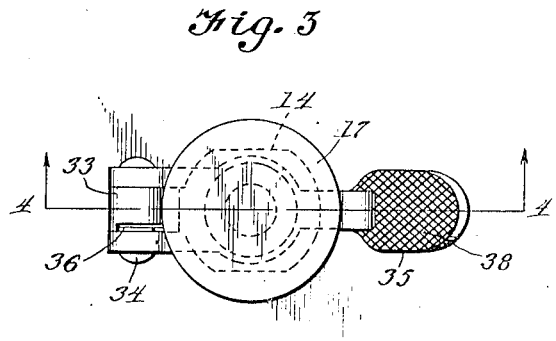
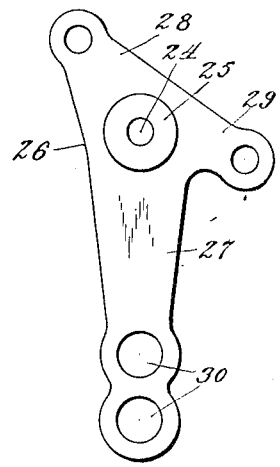
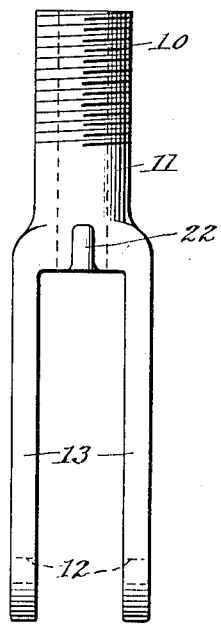

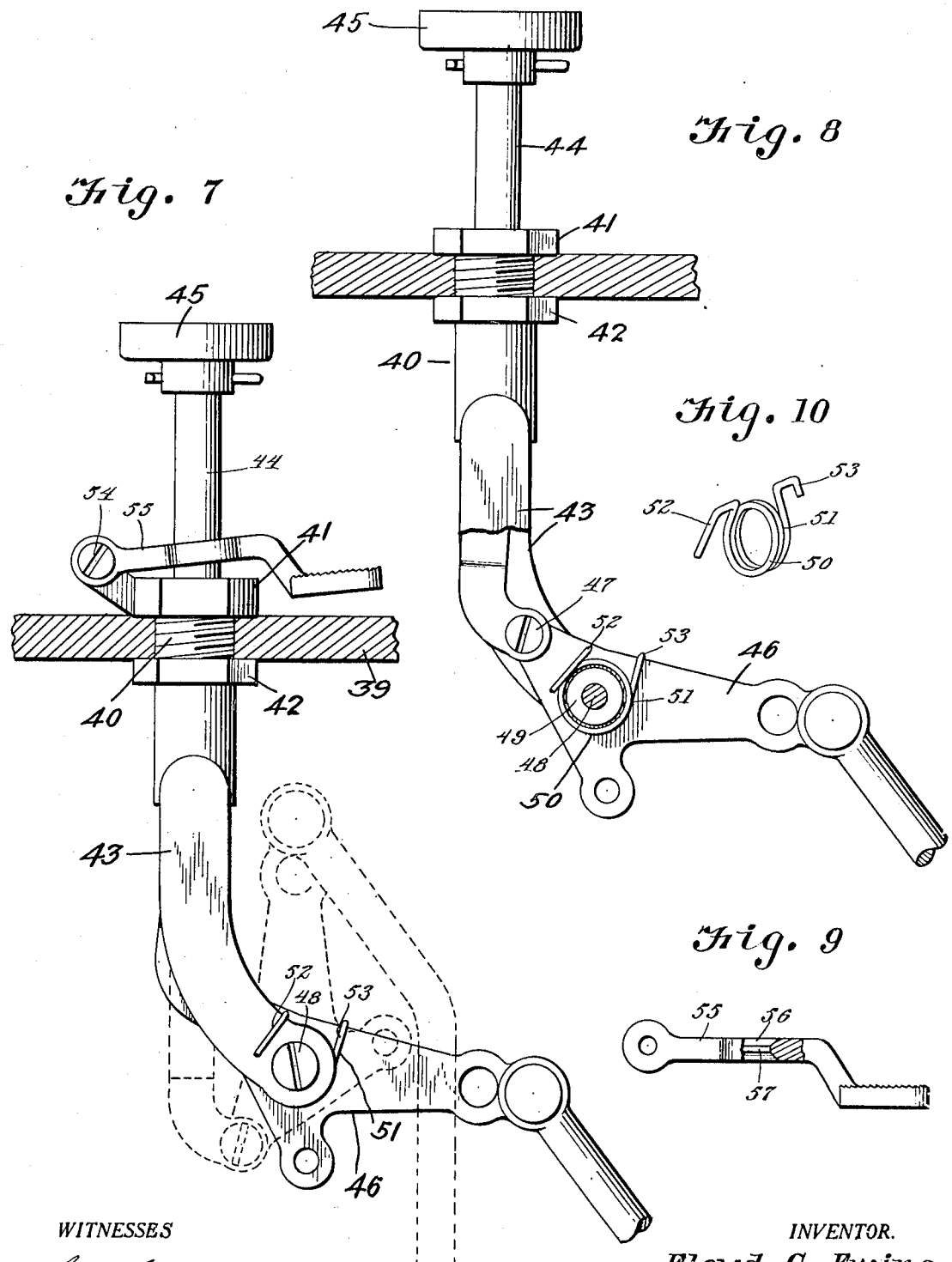

FLOYD C. EWING, OF JEROMESVILLE, OHIO.

PEDAL.

1,308,700.　　　　　Specification of Letters Patent.　　Patented July 1, 1919.

Application filed March 31, 1919. Serial No. 286,275.

*To all whom it may concern:*

Be it known that I, FLOYD C. EWING, a citizen of the United States, residing at Jeromesville, in the county of Ashland and State of Ohio, have invented new and useful Improvements in Pedals, of which the following is a specification.

This invention has reference to an automobile accessory pedal.

An object of the invention is to produce a pedal having means for locking the same when in active or operative position, and which means may be readily actuated to permit of the pedal assuming its normal inactive or inoperative position.

A further object of the invention is to produce a pedal connected to the cut-out, exhaust heater, exhaust whistle, horn, etc., of an automobile, which may be easily, quickly and effectively secured on the machine, one which may be arranged to effect either a pushing or pulling movement upon the device to which it is attached, and one which may be automatically locked in its operative position.

Other objects and advantages will present themselves as the nature of the invention is better understood, reference being had to the accompanying drawings, in which:

Figure 1 is an elevation, parts being in section illustrating the application of the improvement.

Fig. 2 is a similar view but showing the device arranged for exerting a pull upon a chain or rod connected to the mechanism to be actuated by the pedal.

Fig. 3 is a top plan view.

Fig. 4 is a sectional view approximately on the line 4—4 of Fig. 3.

Fig. 5 is a front elevation of the sleeve provided with the bifurcated arms.

Fig. 6 is a plan view of the three-arm lever.

Fig. 7 is a side elevation, parts being in section, of a slightly modified construction.

Fig. 8 is a similar view showing one of the arms of the sleeve with the lower portion thereof broken away, and the pivotal connection between the arms and the three-arm lever in section.

Fig. 9 is a side elevation, parts being broken away and parts being in section of the foot pedal.

Fig. 10 is a perspective view of the spring employed in the modified construction.

In attaching my improvement to the floor or foot board 9 of an automobile, a single hole is drilled therethrough, and through this hole is passed the threaded end 10 of a sleeve 11. The sleeve has its lower portion bifurcated and the arms 13 thus provided are curved at their outer ends, and these curved ends have alining openings 12.

The threaded end of the sleeve 11 is passed through the opening in the foot board 9 of the automobile, and screwed on the said sleeve and contacting with the under and upper faces of the said board 9 are jam nuts 14 and 15 respectively.

Passing through the sleeve 11 is the pedal rod 16. This rod, at its outer end is provided with a removable head 17, preferably secured thereon by a cotter pin. The lower end of the rod, which is received between the arms 13 is reduced from the opposite sides thereof, the said reduced portion receiving the bifurcated end 18 of a link 19, the link being also disposed between the arms 13. The link has its lower or free end curved or arranged at an angle with respect to the longitudinal plane of the body thereof and the said end is bifurcated as at 20. Between the arms provided by the bifurcation 20 the link is formed with an angularly disposed lug 21, and the sleeve 11, between the arms 13 is formed with an oppositely extending lug 22. The lugs 21 and 22 receive thereon the looped ends of a helical spring 23 which swings the link in one direction and normally forces the rod 16 outward of the sleeve.

Passing through the alining openings in the rounded or offset ends of the arms 13 is a pivot 24, the same being preferably in the nature of a screw, and this pivot passes through a boss 25 formed on a lever 26. The lever comprises a member shaped to provide three arms, indicated for distinction by the numerals 27, 28 and 29. The arms 28 and 29 are shorter than the arm 27 and are arranged at opposite angles with respect to the said arm 27. The longer arm 27 has at its end a plurality of spaced openings 30 through one of which is passed and secured the end of a rod or chain 31 that is connected to the cut-out, exhaust heater, whistle or other device to be operated. One of the arms 28 or 29 is received in the bifurcated end 20 of the link 19 and is pivoted thereto as indicated by the numeral 32. The pivot 32 is removable so that the lever may have either of its ends 28 or 29 engage with the link. When the lever is arranged as illustrated in Fig. 1 of the drawings and the push rod is operated against the tension of the spring 23 the lever will be swung to exert a pulling action upon the element 31, while when the second arm 29 is pivotally connected to the link 19, such movement of the pedal rod will swing the lever 26 in an opposite direction, exerting a pull on the element 31.

On the upper jam nut 14 is integrally formed an outstanding upwardly directed ear 33. To this ear is pivotally secured, as at 34 the bifurcated end of a foot pedal 35. Between the pedal 35 and the jamb nut 14 is a spring 36 that swings the pedal at an upward inclination. The pedal is provided with a cam opening 37 through which the pedal rod 16 passes, and the opposite sides of the said opening frictionally contacting with the opposite sides of the rod to effect the holding of the rod in its operative or lowered position. The pedal 35 has its free end formed with a stepped portion, the upper normally horizontal face of which being preferably roughened as indicated by the numeral 38, and this end being disposed a considerable distance outward of the rod 16 readily receives the foot of the operator, when the pedal is to be depressed to permit of the spring 23 moving the rod 16 to its initial inoperative position.

The device may be readily installed on any construction of automobiles. The jam nuts contacting with the upper faces of the floor of the machine hold the device vertical regardless of the vibrations to which the machine is subjected. The upper jam nut 14 may be turned to arrange the pedal at any desired angle, the lower jam nut holding the upper jam nut and the pedal at such angle. The lever may be arranged to either exert a push or a pull upon the rod or chain to which it is attached. The rod 31 may be connected to the arm 27 at either of the openings 30 in the said arm.

The above description refers particularly to the construction illustrated in Figs. 1 to 6 inclusive, while in the remaining figures of the drawings I have illustrated a slight modification.

Passing through an opening in the foot board 38 of a machine is a threaded sleeve 40 that has secured thereon jam nuts 41 and 42 that contact with the opposite faces of the foot board to hold the sleeve thereon. The sleeve has its lower end bifurcated providing parallel arms 43. Passing through the sleeve and received between the arms 43 is a pedal rod 44 that has its outer end provided with a removable head 45. The pedal rod has its lower end reduced and connected to the said reduced end is a link, similar to the link 19. This link has its lower end bifurcated and receives in the said bifurcation one end of a three-arm lever 46. The lever is of a similar construction to the lever 27, previously described, and the pivotal connection between the said lever and the link is in the nature of a removable element, such as a screw 47. The lever is also pivoted as at 48 between the ends of the arms 43, the sides of the lever being provided with outstanding bosses 49 that surround the opening through which the pivot 38 passes. Around one of these bosses is the coiled central portion 50 of a spring 51. The ends of the spring are hooked as at 52 and 53, the hook 53 being arranged over the upper edge of the lever 46 while the hook 52 is arranged over the upper edge of the rounded or curved end of one of the arms 43.

Pivotally secured to the upper jam nut 41, as at 54, is the pedal 55. The pedal has an opening therein through which the pedal rod 44 passes. This opening is preferably round in plan and is, of course, of a sufficient area to permit of the pedal being tilted to cause the opposed walls provided by the opening frictionally contacting with the rod 44. The wall provided by the opening 56 is preferably flared inwardly to the center thereof providing the said center with what may be termed a biting toothed surface 57. The rear wall of the opening may be plain, that is, it need not be provided with the toothed surface 57. The pedal 55 is substantially similar to that previously described and is spring influenced in its connection with the upper jam nut.

It is, of course, obvious that the pedal, in both preferred and modified forms of the improvement may be removed from the upper jam nuts when it is not desirable to hold the rod 44 in its lowered position, and from the foregoing description, when taken in connection with the drawings, it is believed the simplicity of the construction and the advantages thereof will be apparent without further detailed description.

Having thus described the invention, what is claimed as new, is:—

1. In combination with a board having an opening therethrough, of a sleeve in said opening, jam nuts on the sleeve contacting with the opposite faces of the board, a rod slidable through the sleeve, spring means influencing the rod in one direction, and a spring influenced pedal pivoted to one of said jam nuts having an opening therein receiving the rod therethrough and said pedal being normally canted by its spring to cause the opposite walls of the opening to frictionally engage said rod.

2. In combination with a board having an opening therein, of a threaded sleeve in said opening, jam nuts on the sleeve contacting with the opposite faces of the board, spaced arms on the sleeve, a rod slidable through the sleeve, a lever pivotally secured between the arms, a link connection between the lever and the rod, spring means between the link and the sleeve for swinging the link in one direction to normally elevate the rod, and a pedal pivoted to the outer jam nut and having a cam acting hole therein receiving the rod therethrough, said pedal being spring influenced in one direction to cause the opposite walls of the hole to frictionally engage said rod.

3. In combination with a board having an opening therein, of a threaded sleeve in said opening, jam nuts on the sleeve contacting with the opposite faces of the board, said sleeve having its lower end provided with a pair of spaced arms that have their ends rounded outwardly, a three-arm lever pivoted between the said ends of the arms, two of the arms of the lever being of a less length than the remaining arm, each of the shorter arms having an opening therethrough, and the longer arm having a plurality of openings therethrough, a rod slidable through the sleeve and received between the arms thereof, a link pivoted to the rod and to one of the shorter arms of the lever, an ear on the outer jam nut, a pedal having a bifurcated end pivoted to said ear, said pedal having an opening receiving the rod therethrough, spring means between the jam nut and the lever for swinging the latter in one direction to cause the opposite walls provided by the slot to frictionally contact with the opposite sides of the rod, a removable head for the rod, and spring means for normally influencing the rod in one direction.

In testimony whereof I affix my signature.

FLOYD C. EWING.